United States Patent
Wang et al.

(10) Patent No.: US 10,108,549 B2
(45) Date of Patent: Oct. 23, 2018

(54) METHOD AND APPARATUS FOR PRE-FETCHING DATA IN A SYSTEM HAVING A MULTI-LEVEL SYSTEM MEMORY

(71) Applicant: Intel Corporation, Santa Clara, CA (US)

(72) Inventors: Zhe Wang, Hillsboro, OR (US);
Christopher B. Wilkerson, Portland, OR (US); Zeshan A. Chishti, Hillsboro, OR (US); Seth H. Pugsley, Salt Lake City, UT (US); Alaa R. Alameldeen, Hillsboro, OR (US); Shih-Lien L. Lu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 227 days.

(21) Appl. No.: 14/863,255

(22) Filed: Sep. 23, 2015

(65) Prior Publication Data

US 2017/0083443 A1    Mar. 23, 2017

(51) Int. Cl.
*G06F 12/08* (2016.01)
*G06F 12/12* (2016.01)
(Continued)

(52) U.S. Cl.
CPC ........ *G06F 12/0862* (2013.01); *G06F 12/084* (2013.01); *G06F 12/0811* (2013.01);
(Continued)

(58) Field of Classification Search
CPC .............. G06F 12/0862; G06F 12/084; G06F 12/0811; G06F 2212/6024;
(Continued)

(56) References Cited

U.S. PATENT DOCUMENTS 5,912,839 A    6/1999    Ovshinsky et al.
6,662,273 B1   12/2003   Wilkerson et al.
(Continued)

FOREIGN PATENT DOCUMENTS

EP    2204741 A1    7/2010
WO    2003040916 A1    5/2003

OTHER PUBLICATIONS

Stephen Somogyi, Spatial Memory Streaming, In Proceedings of the 33rd Annual International Symposium on Computer Architecture(ISCA'2006), IEEE Computer Society,Washington,DC,USA, pp. 252-263.

(Continued)

*Primary Examiner* — Zhuo Li
(74) *Attorney, Agent, or Firm* — Compass IP Law PC (57) ABSTRACT

A method is described that includes creating a first data pattern access record for a region of system memory in response to a cache miss at a host side cache for a first memory access request. The first memory access request specifies an address within the region of system memory. The method includes fetching a previously existing data access pattern record for the region from the system memory in response to the cache miss. The previously existing data access pattern record identifies blocks of data within the region that have been previously accessed. The method includes pre-fetching the blocks from the system memory and storing the blocks in the cache.

17 Claims, 6 Drawing Sheets

(51) Int. Cl.
*G06F 12/0862* (2016.01)
*G06F 12/0811* (2016.01)
*G06F 12/084* (2016.01)

(52) U.S. Cl.
CPC ...... *G06F 12/12* (2013.01); *G06F 2212/1024* (2013.01); *G06F 2212/1044* (2013.01); *G06F 2212/6024* (2013.01)

(58) Field of Classification Search
CPC ..... G06F 2212/1024; G06F 2212/1044; G06F 12/12; G06F 2212/1021; G06F 2212/602; G06F 12/023; G06F 12/08; G06F 12/0802; G06F 12/1018; G06F 2212/502; G06F 2212/652

See application file for complete search history.

(56) References Cited

U.S. PATENT DOCUMENTS

| | | | |
|---|---|---|---|
| 6,760,816 | B1 | 7/2004 | Ju et al. |
| 6,779,108 | B2 | 8/2004 | Ju et al. |
| 6,785,797 | B2 | 8/2004 | Wong et al. |
| 6,931,490 | B2 | 8/2005 | Wong et al. |
| 7,114,059 | B2 | 9/2006 | Wilkerson |
| 7,590,918 | B2 | 9/2009 | Parkinson |
| 7,600,078 | B1 | 10/2009 | Cen et al. |
| 7,756,053 | B2 | 7/2010 | Thomas et al. |
| 7,913,147 | B2 | 3/2011 | Swaminathan et al. |
| 8,051,253 | B2 | 11/2011 | Okin et al. |
| 8,462,537 | B2 | 6/2013 | Karpov et al. |
| 8,462,577 | B2 | 6/2013 | Zeng et al. |
| 8,463,948 | B1 | 6/2013 | Qawami et al. |
| 8,612,676 | B2 | 6/2013 | Dahlen et al. |
| 8,605,531 | B2 | 12/2013 | Kau et al. |
| 8,607,089 | B2 | 12/2013 | Qawami et al. |
| 8,612,809 | B2 | 12/2013 | Casper et al. |
| 8,649,212 | B2 | 2/2014 | Kau et al. |
| 8,838,935 | B2 | 9/2014 | Hinton |
| 9,176,878 | B2 * | 11/2015 | Ono .................. G06F 12/0862 |
| 9,298,606 | B2 | 3/2016 | Ramanujan |
| 9,317,429 | B2 | 4/2016 | Ramanujan et al. |
| 9,342,453 | B2 | 5/2016 | Nale et al. |
| 9,378,133 | B2 | 6/2016 | Nachimuthu et al. |
| 9,430,372 | B2 | 8/2016 | Nachimuthu et al. |
| 2005/0268046 | A1 | 12/2005 | Heil |
| 2006/0149904 | A1 | 7/2006 | Mowry |
| 2007/0005922 | A1 | 1/2007 | Swaninathan et al. |
| 2008/0016269 | A1 | 1/2008 | Chow et al. |
| 2008/0034148 | A1 | 2/2008 | Gower |
| 2008/0215816 | A1 | 4/2008 | Emma et al. |
| 2008/0270811 | A1 | 10/2008 | Chow et al. |
| 2009/0217004 | A1 * | 8/2009 | Van De Waerdt .......................... G06F 12/0862 712/207 |
| 2009/0313416 | A1 | 12/2009 | Nation |
| 2010/0110748 | A1 | 5/2010 | Best |
| 2010/0131827 | A1 | 5/2010 | Sokolov |
| 2010/0241813 | A1 * | 9/2010 | Shen .................. G06F 9/52 711/144 |
| 2010/0262750 | A1 * | 10/2010 | Deshpande ......... G06F 12/0862 711/3 |
| 2010/0291867 | A1 | 11/2010 | Abdulla et al. |
| 2010/0293317 | A1 | 11/2010 | Confalonieri et al. |
| 2010/0306446 | A1 | 12/2010 | Villa et al. |
| 2010/0306453 | A1 | 12/2010 | Doller |
| 2010/0318718 | A1 | 12/2010 | Eilert et al. |
| 2011/0153916 | A1 | 6/2011 | Chinnaswamy et al. |
| 2011/0208900 | A1 | 8/2011 | Schuette et al. |
| 2011/0276786 | A1 * | 11/2011 | Eichenberger ........ G06F 8/4442 712/207 |
| 2011/0291884 | A1 | 12/2011 | Oh et al. |
| 2012/0159073 | A1 | 6/2012 | Jaleel et al. |
| 2012/0324142 | A1 | 12/2012 | Boyle et al. |
| 2013/0166846 | A1 | 6/2013 | Gaur et al. |
| 2013/0268728 | A1 | 10/2013 | Ramanujan et al. |
| 2013/0275661 | A1 | 10/2013 | Zimmer et al. |
| 2013/0290597 | A1 | 10/2013 | Faber |
| 2014/0129767 | A1 | 5/2014 | Ramanujan et al. |
| 2014/0297938 | A1 | 10/2014 | Puthiyedath et al. |
| 2015/0015555 | A1 | 1/2015 | Wilkerson |
| 2015/0026413 | A1 | 1/2015 | Meir et al. |
| 2015/0118766 | A1 | 4/2015 | Pollack et al. |

OTHER PUBLICATIONS

S.Srinath, Feedback Directed Prefetching:Improving the Performance and Bandwidth-Efficiency of Hardware Prefetchers. In High Performance Computer Architecture (HPCA),2010 IEEE 16th International Symposium on, pp. 63-74, 2007.

Lee et al., "Architecting Phase Change Memory as a Scalable DRAM Alternative", ISCA '09, Jun. 20, 2009, 12 pgs., Austin, Texas, USA.

Condit et al., "Better I/O Through Byte-Addressable, Persistent Memory", SOSP '09, Oct. 11, 2009, pp. 133-146. Big Sky, Montana, USA.

Freitas et al., "Storage-class memory: The next storage system technology", IBM J. Res. & Dev., Jul./Sep. 2008, pp. 439-447, vol. 52, No. 4/5.

Akel et al., "Onyx: A Prototype Phase Change Memory Storage Array",www.flashmemorysummit.com/.../Proceeding_2011/08/11_S301_Akel.pdf, 5 pgs.

Mearian, "IBM announces computer memory breakthrough Phase-change memory offers 100 times the write performance of NAND flash", Jun. 30, 2011, 3 pgs.

Caulfield et al., "Moneta: A High-performance Storage Array Architecture for Next-generation, Non-volatile Memories", MICRO 43: Proceedings of the 43rd Annual IEEE/ACM International Symposium on Microarchitecture, Atlanta, GA Dec. 2010 pp. 385-395.

"The Non-Volatile Systems Laboratory Coding for non-volatile memories", http://nvsl.ucsd.edu/ecc, printed Sep. 1, 2011. 2 pgs.

"The Non-Volatile Systems Laboratory Moneta and Onyx: Very Fast SS", http://nvsl.ucsd.edu/moneta/, 3 pgs., Sep. 1, 2011.

"The Non-Volatile Systems Laboratory NV-Heaps: Fast and Safe Persistent Objects", http://nvsl.ucsd.edu/nvuheaps/, 2 pgs., Sep. 1, 2011.

"Phase change memory-based 'moneta' system points to the future of computer storage", ScienceBlog, Jun. 2, 2011, 7 pgs.

Quereshi et al., "Scalable High Performance Main Memory System Using Phase-Change Memory Technology", ISCA '09, Jun. 20, 2009, 10 pgs., Austin, Texas, USA.

Kant, Dr. Krishna, "Exploiting NVRAM for Building Multi-Level Memory Systems", International Workshop on Operating System Technologies for Large Scale NVRAM, Oct. 21, 2008, Jeju, Korea, 19 pages.

Bailey et al., "Operating System Implications of Fast, Cheap, Non-Volatile Memory" 13th USENIX, HOTOS11 2011, May 9-11, 2011, 5 pgs.

Raoux et al., "Phase-change random access memory: A scalable technology", IBM J. Res. & Dev., Jul./Sep. 2008, pp. 465-479, vol. 52, No. 4/5.

Chen et al., "Rethinking Database Algorithms for Phase Change Memory", 5th Biennial Conference on Innovative Data Systems Research (CIDR '11), Jan. 9, 2011, 11 pgs., Asilomar, California, USA.

Jacob et al., "The Memory System You Can't Avoid It, You Can't Ignore It, You Can't Fake It", 2009, 77 pgs., Morgan & Claypool.

Mogul et al., "Operating System Support for NVM+DRAM Hybrid Main Memory", 12th Workshop on Hot Topics in Operating Systems (HatOS XII), May 18, 2009, 9 pgs.

Wu, et al., "eNVy: A Non-Volatile, Main Memory Storage System" 1994 ACM., ASPLOS VI. pp. 86-97.

Dhiman, et al. "PDRAM: A Hybrid PRAM and DRAM Main Memory System", Jul. 26, 2009, Department of Computer Science and Engineering, 6 pages.

(56) References Cited

OTHER PUBLICATIONS

Khan, Samira, et al. "Sampling Dead Block Prediction for Last-Level_Caches", Proceedings of the 43rd Annual IEEE/ACM International Symposium on Microarchitecture (MICRO-43), Dec. 2010, 12 pages.

Notification of The Transmittal of The International Search Report and The Written Opinion for related PCT/US2016/045035, dated Nov. 9, 2016, 10 pages.

* cited by examiner

Fig. 6

METHOD AND APPARATUS FOR PRE-FETCHING DATA IN A SYSTEM HAVING A MULTI-LEVEL SYSTEM MEMORY

FIELD OF INVENTION

The field of invention pertains generally to the computing sciences, and, more specifically, to a method and apparatus for pre-fetching data from memory.

BACKGROUND

Figure 1:
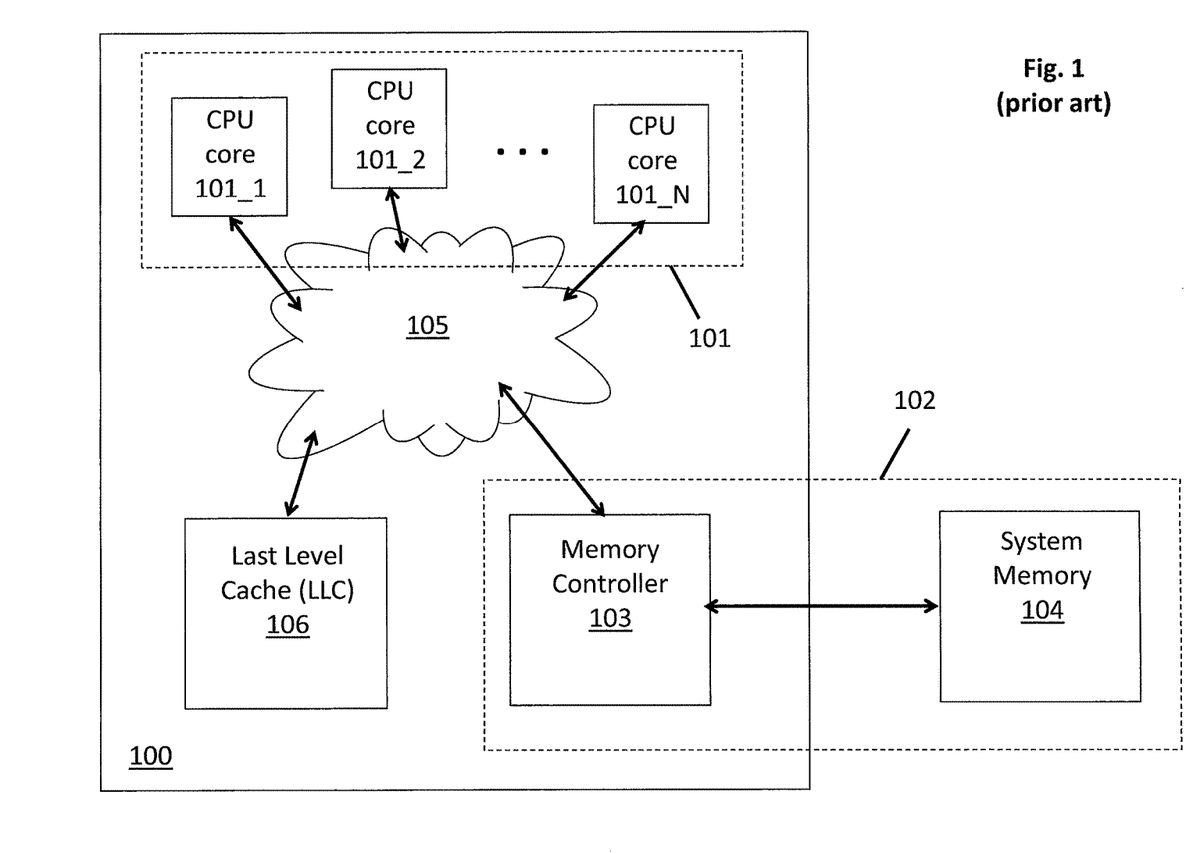
FIG. 1 shows a computing system

FIG. 1 depicts a traditional CPU complex 101 and system memory complex 102 for a multi-core processor 100. The processor or "host" side of the system memory complex 102 includes a memory controller 103 that interfaces with a system memory 104. As is understood in the art, the individual processing cores 101_1 through 101_N of a multi-core processor will snoop their internal caches (not shown) for the program and data needed by their respective threads. If an item of program code or data desired by a processing core thread is not found in the core's cache, the program code or data item may ultimately be fetched from system memory 104 by the memory controller 103.

The processing cores 101_1 through 101_N are interconnected by an interconnection network 105 (e.g., mesh network, front side bus, etc.) that is coupled to a last level cache 106. A last level cache 106, typically, caches program code and data for all the cores 101_1 through 101_N of the processor 100 rather than any particular core. A last level cache 106 is typically the last cache that is snooped for a desired item of program code or data before fetching the item from system memory 104 through the memory controller 103.

Accurately predicting what items of data will be needed in the future, reading the data from system memory 104 and loading the data into the last level cache 106 can greatly improve system performance. Here, the time cost of retrieving the data is reduced to the time cost of obtaining it from the last level cache 106 which can be a significantly less than the time cost of retrieving it from system memory 104.

In one approach, referred to as "spatial memory streaming", copies of the program counter values from the processing cores' various threads are sent through the processor 100 down to the last level cache 106. Prefetcher logic associated with the last level cache 106 studies the program counter values for data access patterns and any data that is deemed to be likely to be called upon by a software thread but is currently not within the last level cache 106 is called up from system memory 104 by the memory controller 103 and stored in the last level cache 106.

According to one approach, a large pattern history table structure is coupled with the prefetcher logic to store the data access patterns of the processor's various threads. Apart from the size of the table being very large and consuming large amounts of processor chip space, there can be aliasing problems when trying to access the table. Here, a hash of program counter and offset values are used to access the table. In the case of a large table structure, different program counter and offset values can hash to a same table entry (which corresponds to improper operation of the table itself).

BRIEF DESCRIPTION OF THE DRAWINGS

A better understanding of the present invention can be obtained from the following detailed description in conjunction with the following drawings, in which.

DETAILED DESCRIPTION

A solution to the implementation problems associated with LLC data pre-fetching described in the background is to store pattern history information in an upper/faster tier of a multi-tiered system memory. By so doing, the pattern history table information can be, e.g., kept off the processor chip so as to conserve processor semiconductor real estate and/or hash aliasing problems attempting to reach the pattern history information can be minimized or even eliminated.

Figure 2:
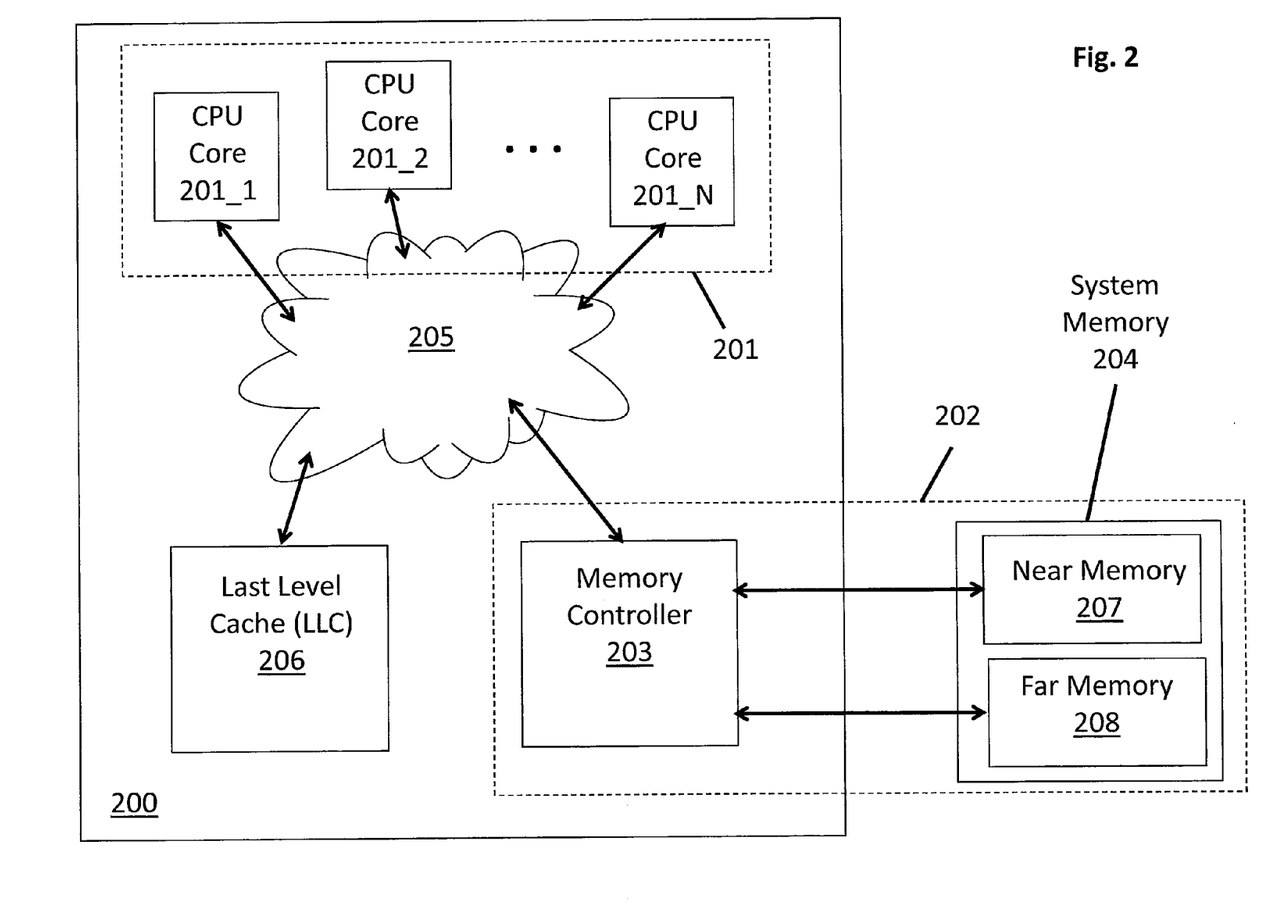
FIG. 2 shows a computing system having a multi-level system memory.

FIG. 2 shows an embodiment of a system having a multi-tiered or multi-level system memory 204. According to various embodiments, a near memory 207 may be utilized as a memory side cache. In the case where near memory 207 is used as a memory side cache, near memory 207 is used to store data items that are expected to be more frequently called upon by the computing system. In some cases, the near memory cache 207 has lower access times than the lower tiered far memory 208 region. By storing the more frequently called upon items in near memory 207, the system memory 204 will be observed as faster because the system will often read items that are being stored in faster near memory 207.

According to some embodiments, for example, the near memory 207 exhibits reduced access times by having a faster clock speed than the far memory 208. Here, the near memory 207 may be a faster, volatile system memory technology (e.g., high performance dynamic random access memory (DRAM)). By contrast, far memory 208 may be either a volatile memory technology implemented with a slower clock speed (e.g., a DRAM component that receives a slower clock) or, e.g., a non volatile memory technology that is inherently slower than volatile/DRAM memory.

For example, far memory 208 may be comprised of an emerging non volatile byte addressable random access memory technology such as, to name a few possibilities, a phase change based memory, a ferro-electric based memory (e.g., FRAM), a magnetic based memory (e.g., MRAM), a spin transfer torque based memory (e.g., STT-RAM), a resistor based memory (e.g., ReRAM) or a "Memristor" based memory, universal memory, Ge2Sb2Te5 memory, programmable metallization cell memory, amorphous cell memory, Ovshinsky memory, dielectric memory, etc.

Such emerging non volatile random access memories technologies typically have some combination of the following: 1) higher storage densities than DRAM (e.g., by being constructed in three-dimensional (3D) circuit structures (e.g., a crosspoint 3D circuit structure); 2) lower power consumption densities than DRAM (e.g., because they do not need refreshing); and/or 3) access latency that is slower than DRAM yet still faster than traditional non-volatile memory technologies such as FLASH. The later characteristic in particular permits an emerging non volatile memory technology to be used in a main system memory role rather than a traditional storage role (which is the traditional architectural location of non volatile storage).

Regardless of whether far memory 208 is composed of a volatile or non volatile memory technology, in various embodiments far memory 208 acts as a true system memory in that it supports finer grained data accesses (e.g., cache lines) rather than larger sector based accesses associated with traditional, non volatile storage (e.g., solid state drive (SSD), hard disk drive (HDD)), and/or, otherwise acts as an (e.g., byte) addressable memory that the program code being executed by processing cores operate out of.

Because near memory 207 acts as a cache, near memory 207 may not have its own individual addressing space. Rather, in some cases, only far memory 208 includes the individually addressable memory space of the computing system's main memory. In various embodiments near memory 207 acts as a cache for far memory 208 rather than acting as a last level CPU cache. Generally, a last level cache, such as last level cache 206, is able to keep cache lines across the entirety of system memory addressing space that is made available to the processing cores 201_1 through 201_N that are integrated on a same semiconductor chip as the memory controller 203.

For example, in various embodiments, system memory 204 is implemented with dual in-line memory module (DIMM) cards where a single DIMM card has both DRAM and (e.g., emerging) non volatile memory chips disposed in it. The DRAM chips effectively act as an on board cache for the non volatile memory chips on the DIMM card. Ideally, the more frequently accessed cache lines of any particular DIMM card will be found on that DIMM card's DRAM chips rather than its non volatile memory chips. Given that multiple DIMM cards are typically plugged into a working computing system and each DIMM card is only given a section of the system memory addresses made available to the processing cores 201_1 through 201_N of the semiconductor chip 200 that the DIMM cards are coupled to, the DRAM chips are acting as a cache for the non volatile memory that they share a DIMM card with rather than a last level CPU cache.

In other configurations DIMM cards having only DRAM chips may be plugged into a same system memory channel (e.g., a DDR channel) with DIMM cards having only non volatile system memory chips. Ideally, the more frequently used cache lines of the channel will be found in the DRAM DIMM cards rather than the non volatile memory DIMM cards. Thus, again, because there are typically multiple memory channels coupled to a same semiconductor chip 200 having multiple processing cores 201_1 through 201_N, the DRAM chips are acting as a cache for the non volatile memory chips that they share a same channel with rather than as a last level CPU cache.

Although the above example referred to packaging solutions that included DIMM cards, it is pertinent to note that this is just one example and other embodiments may use other packaging solutions (e.g., stacked chip technology, one or more DRAM and phase change memories integrated on a same semiconductor die or at least within a same package as the processing core(s) 201_1 through 201_N, etc.).

In yet other embodiments, near memory 207, or at least a portion of it, may act as a CPU level cache, or, may be given system addressing space so as to behave as a faster/higher priority region of addressable system memory.

In implementations where near memory 207 acts as a cache, the architecture of the near memory cache 207 may also vary among embodiments. According to one approach, the near memory cache 207 is implemented as a direct mapped cache in which multiple system memory addresses map to one cache line slot in near memory 207. Other embodiments may implement other types of cache structures (e.g., set associative, etc.).

Regardless of the specific cache architecture, different cache lines may compete for the same cache resources in near memory 207. For example, in the case of a direct mapped cache, when requests for two or more cache lines whose respective addresses map to the same near memory 207 cache line slot are concurrently received by the memory controller 203, the memory controller 203 will keep one of the cache lines in near memory cache 203 and cause the other cache line to be kept in far memory 204.

Whenever a request for a cache line is received by the memory controller 203 the memory controller 203 first checks for the cache line in near memory cache 207. If the result is a cache hit, the memory controller 203 services the request from the version of the cache line in near memory 207. In the case of a read request, the version of the cache line in near memory cache 207 is forwarded to the requestor. In the case of a write, the version of the cache line in near memory cache 203 is written over and kept in the near memory cache 207. In the case of a cache miss, for both read and write requests, the cache line that is targeted by the request is called up from far memory 208 and stored in near memory cache 207. In order to make room for the new cache line in near memory cache 207, another cache line that competes with the targeted cache line is evicted from near memory cache 207 and sent to far memory 208.

According to one approach, the memory controller 203 maintains a tag cache or other local set of information that identifies what cache lines have contents that are stored in near memory 207. By locally tracking within the memory controller 203 contents of which cache lines are stored in near memory 207, the memory controller 203 does not have to actually access near memory 207 to determine whether a cache hit or cache miss has occurred for a particular request. Other embodiments may not include such local information within the memory controller 203. In these embodiments, the memory controller 203 may physically access near memory 207 in order to determine cache hit/miss status for a request.

In yet other embodiments, as mentioned above, near memory 207 (or at least a portion of it) does not behave as a memory side cache or CPU level cache but is instead given a range of system memory address space and therefore acts as a region of addressable system memory having lower latency than far memory 208 addressing space. Here, data and/or program code allocated to near memory 207 may be given higher priority status because it can be reached with the lower latency access times than program and/or data stored in far memory.

Figure 3:
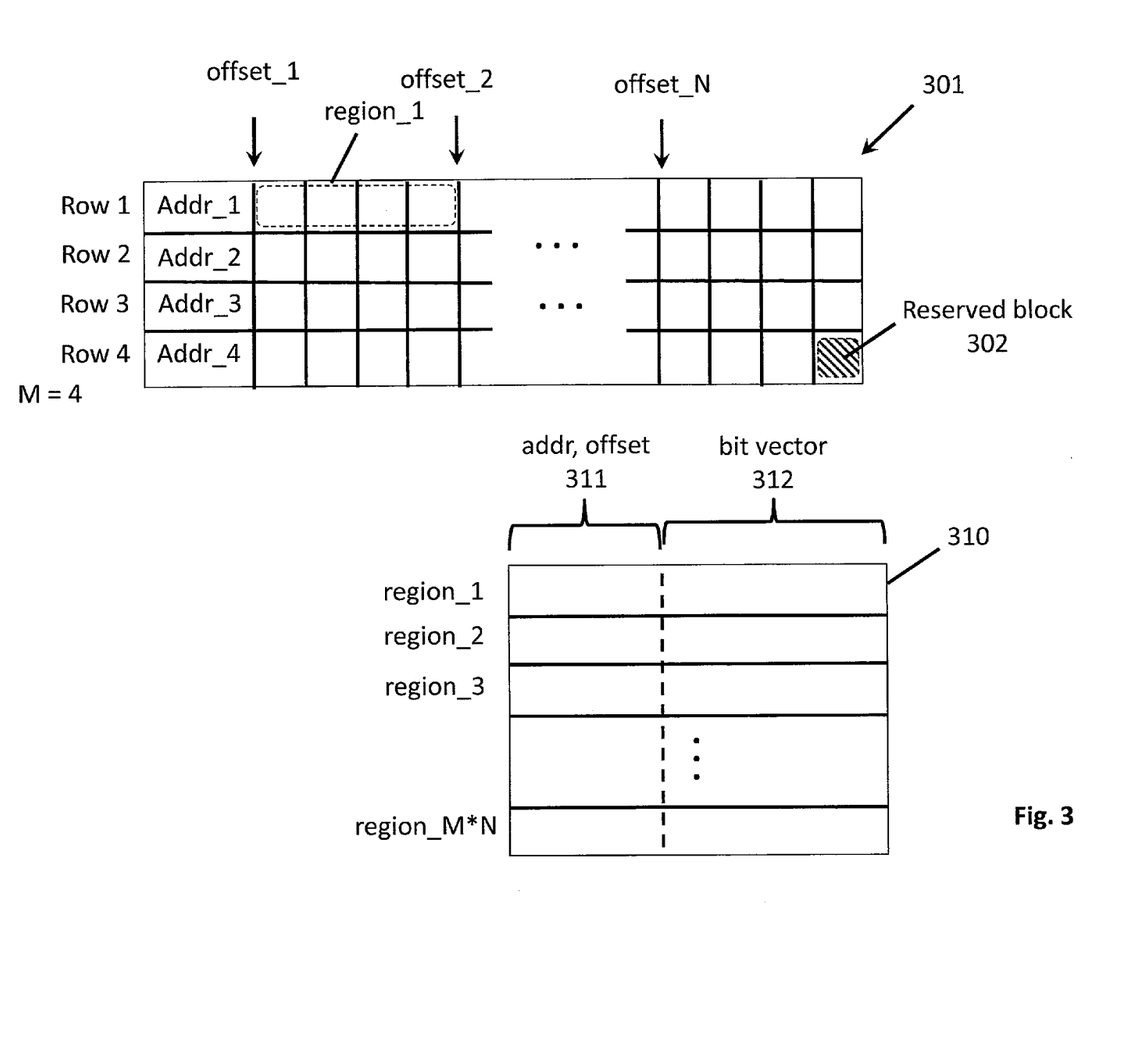
FIG. 3 shows a perspective of a near memory cache.

FIG. 3 shows an embodiment of a near memory addressing structure 301 that may be used for data-prefetching. Here, as the above discussion of a multi-level system memory 204 focused on accesses at cache line granularity when servicing traditional requests to system memory 204. By contrast, the near memory organization structure 301 for data-prefetching may be organized to view the contents of near memory at a different granularity.

As observed in FIG. 3, the near memory can be viewed as an array of rows 301 where each row has a different base address. Each row can be further broken down into N regions, where each region is separately addressable with its row's base address and an offset within the row that specifies the location of the particular region within the row. In an embodiment, a region corresponds to a page of information.

Each region, in turn, is viewed as being broken down into a number of blocks. The exemplary depiction of FIG. 3 shows four blocks per region. Other embodiments may have a different number of blocks (e.g., 32 blocks per region). As will be described in more detail below, data access patterns are tracked at a block level of granularity.

In various embodiments, a block may correspond to a single cache line or multiple cache lines depending on implementation. Here, note that the actual/physical access to system memory including near memory may remain at cache line granularity. The pre-fetching mechanism as described herein, however, may build a view of system memory that may be coarser than cache line granularity, e.g., depending on how many cache lines fit into a single block (e.g., if a block is the size of a cache line then the granularity of the pre-fetching mechanism is at cache line granularity).

Spatial locality refers to the tendency of a software program to call upon data items that are "close" to one another in terms of their respective system memory addresses. As such, as will be described in more detail below, the pre-fetching activity may fetch an entire block of data and store it in the LLC. If a single block encompasses multiple cache lines, the actual/physical pre-fetching activity may entail reading multiple cache lines from system memory and storing them in the LLC. By contrast if a block corresponds to a single cache line, a block is fetched from system memory by fetching a single cache line from system memory.

According to an embodiment, for every contiguous group of M rows of near memory, data access pattern information is stored in a reserved block 302 amongst the M rows. In the particular embodiment of FIG. 3, M=4 and the reserved block 302 is located in the last block of the last region of the 4th (Mth) row. In various other embodiments, groups larger or smaller than M=4 may be implemented and/or other locations of the reserved block may be configured for within the M rows.

Inset 310 shows an embodiment of the data access pattern information as it is stored in the reserved block of FIG. 3. As observed at inset 310, the data access pattern information can include up to one data access pattern record for every region within the group of M rows. As such, the data access pattern can include as many as M*N records. For example, in an implementation where N=3 and M=4, there can be as many as 12 records in the reserved block 302, 310.

As observed in FIG. 3, in an embodiment, each of the records identify the particular region it corresponds to by identifying its region's base address and offset in a first portion 311. A second portion 312 is a bit vector that tracks the usage of the different blocks of data within the region. Here, each bit in the bit vector corresponds to a different block within the region. If data within a block has been previously accessed by an executing thread, the block's bit within the bit vector 312 is "set" (e.g., to a "1"). Likewise, if data within a block has not been accessed yet by an executing thread, the block's bit will not be "set" in the bit vector 312 (e.g., instead it will have a value of "0").

Figure 4:
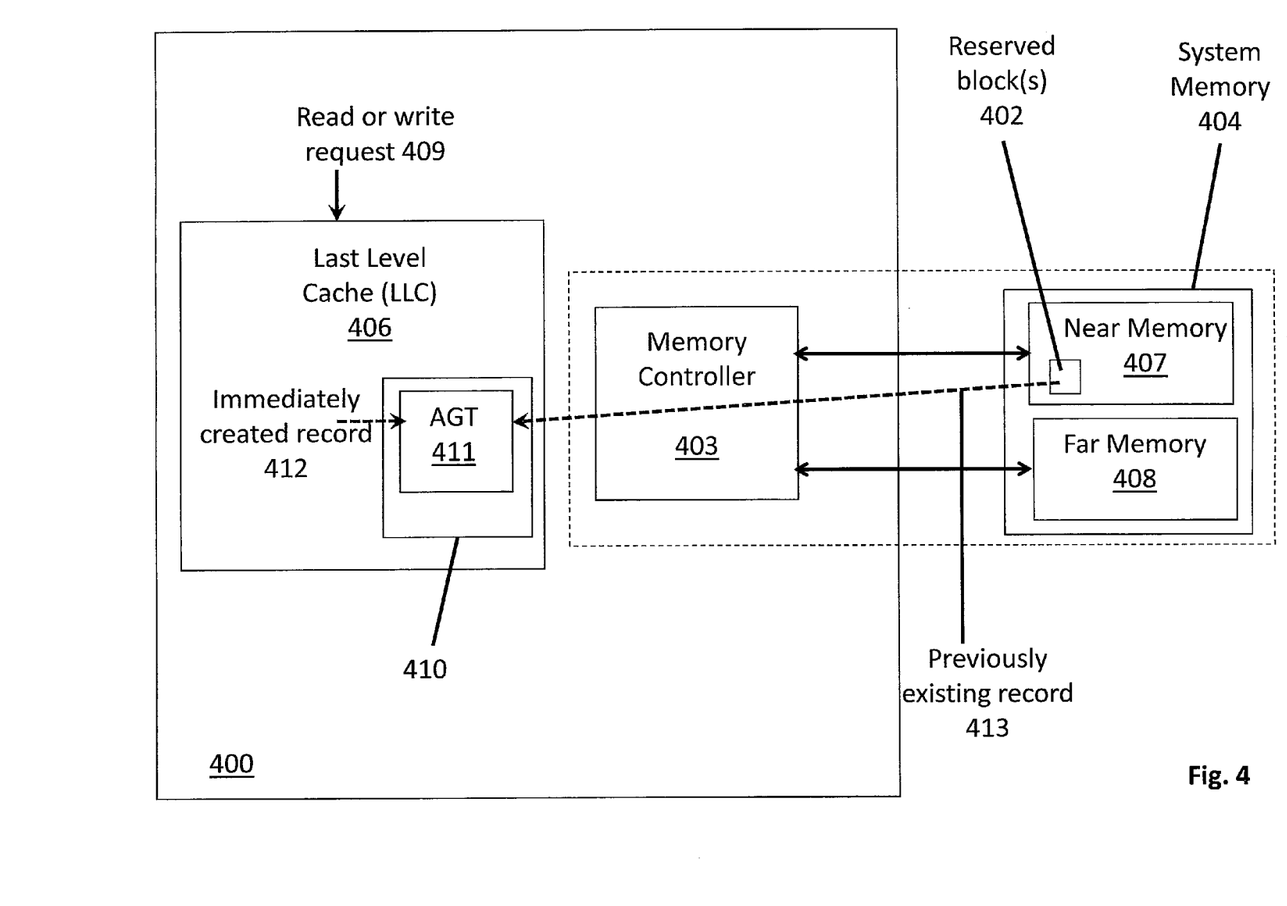
FIG. 4 shows a computing system having a multi-level system memory that is capable of pre-fetching into a last level cache.

FIG. 4 shows an embodiment of an LLC pre-fetching architecture that keeps data pattern access records (e.g., within reserved blocks 402 as described above in FIG. 3) in the near memory 407 of a multi-level system memory 404. As observed in FIG. 4, LLC control logic 410 includes an active generation table (AGT) 411. In an embodiment, the AGT 411 creates the per region data access pattern records that are stored in the reserved block of each group of M near memory rows (as discussed above with respect to FIG. 3). Here, when a read or write memory access request 409 for a data item arrives at the LLC 406 from one of the processing cores (not shown in FIG. 4 for simplicity), the AGT 411 is checked to see if the address of the data item falls within one of the regions whose record is within the AGT 411.

In an embodiment, if the request's region's record is not in the AGT 411, the control logic 410 will immediately create a record 412 for the region, store it in the AGT 411 and set the bit of the particular block within the bit vector of the newly created record that the address of the received request corresponds to (e.g., if the address of the received request corresponds to the seventh block within the region, the seventh bit of the record's bit vector is set).

Note that the absence of a received request's corresponding region's record within the AGT 411 is an indication of a cache miss at the LLC 406. As such, the memory controller 403 will subsequently seek to fetch the missing data item from system memory 404. As part of the data fetch from system memory 404, the memory controller 403 may also attempt to fetch the reserved block 402 within near memory 407 that stores the data pattern records for the regions within the M group of memory rows that the data address of the request 409 falls within. By so doing, the memory controller 403 will obtain a previously existing data access pattern record 413 for the region that that address of the request 409 falls within, if it exists. Alternatively to fetching an entire reserved block (e.g., if a block is larger than a cache line), the memory controller 403 may seek to fetch just the previously existing data access pattern record 413 for the region that the address of the request 409 address falls within.

In any case, upon a miss at the LLC 406, the memory controller 403 may seek to fetch the previously existing data access pattern record 413 for the request's region from near memory 407 and, if it exists in near memory 407, forward it to the LLC control logic 410. If no record exists for the region in near memory 407, then, the recent memory request 409 that prompted the look into near memory 407 is the first request for the request's region. In this case, the record 412 that was immediately created for the region by the control logic 410 is the first record to be created for the region.

If a previously existing record 413 for the region was found in near memory 407 and forwarded to control logic 410, the previously existing record's bit vector is studied by logic 401 and any blocks whose bit is set are called up from system memory 404 and loaded into the LLC 406. Additionally, the bit vector of the previously existing record 413 is also updated to set the bit for the block that the recent memory access request 409 that experienced the LLC cache miss falls within (if that block was not set in the previously existing record 413). The previously existing record 413 is then written into the AGT 411 over the earlier record 412 that was immediately created upon the initial LLC cache miss.

The immediate creation of a record 412 at the LLC upon recognition of a miss at the LLC serves a number of purposes. First, even if a previously existing record 413 exists within near memory 407 and it is fetched and returned to the LLC control logic 410, in the interim (the time it takes to actually fetch the record 413 and provide it to the LLC control logic 410), more requests whose addresses fall within other blocks of the original request's 409 region may be received at the LLC 406. As such, the immediate record 412 can be updated to set the bits for these blocks within the bit vector until the previously existing record 413 arrives. Again, the content of the newer, immediately created bit vector 412 will be used to update the content of the older previously existing bit vector 413 before the later is written into the AGT 411. From there going forward, any new requests whose addresses fall within other blocks of the region will cause the bit vector within the AGC 411 to be updated.

A second reason for the creation of the immediate version of the record 412 is that, in various embodiments, even if a previously existing record 413 exists within system memory, it may not currently exist in near memory cache 407 (it is instead in far memory 408). According to one approach, the record for the region (or the entire set of records for the group of M rows that that the request's region falls within) is only fetched from system memory 404 and forwarded to the LLC control logic 410 if it exists in near memory 407 (e.g., so as to reduce the time cost of the pre-fetching activity).

According to one approach, as mentioned above with respect to FIG. 2, the set of M rows that the request's region/block falls within are allocated system memory address space within near memory 407. In this case, at least for the set of M rows, near memory 407 is not acting as a cache but, e.g., as a high priority region of system memory 404. In this case, the reserved block of records for the set of M rows should always exist in near memory 407. As such, anytime there is a cache miss at the LLC 406, a previously existing record 413 (if it exists) for the region of the request 409 that just missed at the LLC 406 will be received by the LLC control logic 410.

In other embodiments, also as described at length above with respect to FIG. 2, near memory 407 is used to implement a cache and it is possible that the desired reserve block or data pattern record is not within the faster near memory cache but is instead in slower far memory 408. In such a case, in an embodiment, the reserve block and/or previously existing record may, depending on implementation, either be called up from far memory 408 and forwarded to the LLC control logic 410, or, the deeper read into far memory for the reserve block may not be attempted at all (e.g., because the time cost of accessing the slower far memory 408 is too expensive for the pre-fetching activity).

In the case of the former (the reserve block is fetched from far memory and forwarded to the LLC), the time consumed waiting for the previously existing record 413 is extended which increases the likelihood that another request will arrive at the LLC 406 whose address falls within the region thereby requiring the setting of another bit in the bit vector of the newer, immediately created record 412. In the case of the later (the reserve block is not fetched from far memory 408), the system uses the newer, immediately created record 412 in the AGT 411 to record the data pattern access activity within the region from the perspective of the LLC 406.

According to another approach, if a data item within the region is evicted from the LLC 406, an attempt is made to evict the entire data pattern record from the AGT 411 and store it in near memory 407. Again, in the case where the set of M memory rows are allocated system memory address space in near memory (near memory is not acting as a memory side cache), the record should be able to be evicted to near memory 407 in all cases because the reserve block is quasi-permanently located there.

Contrarily, in the case where near memory acts as a memory side cache, there is some chance that a copy of the reserve block is not within near memory cache 407. In an embodiment, the attempt to evict the record from the AGT 410 includes checking to see if the reserve block exists in near memory cache 407. If it does, the record being evicted from the AGT 410 is written/merged into the reserved block in near memory cache 407 and is removed from the AGT 410. If it does not, the attempt to evict the record from the AGT 410 is dropped and the record remains in the AGT 410.

Figure 5:
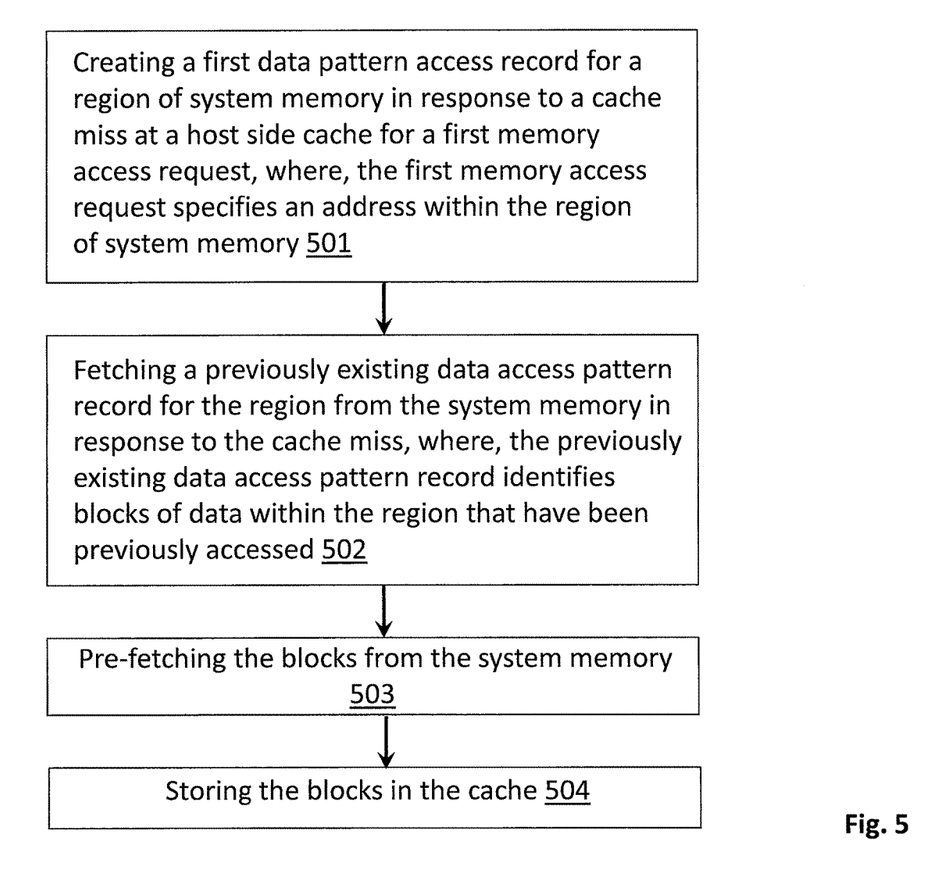
FIG. 5 shows a method of pre-fetching performed by a computing system having a multi-level cache.

FIG. 5 shows a method described above. As observed in FIG. 5, the method includes creating 501 a first data pattern access record for a region of system memory in response to a cache miss at a host side cache for a first memory access request, where, the first memory access request specifies an address within the region of system memory. The method also includes fetching 502 a previously existing data access pattern record for the region from the system memory in response to the cache miss, where, the previously existing data access pattern record identifies blocks of data within the region that have been previously accessed. The method also includes pre-fetching 503 the blocks from the system memory and storing 504 the blocks in the cache.

Figure 6:
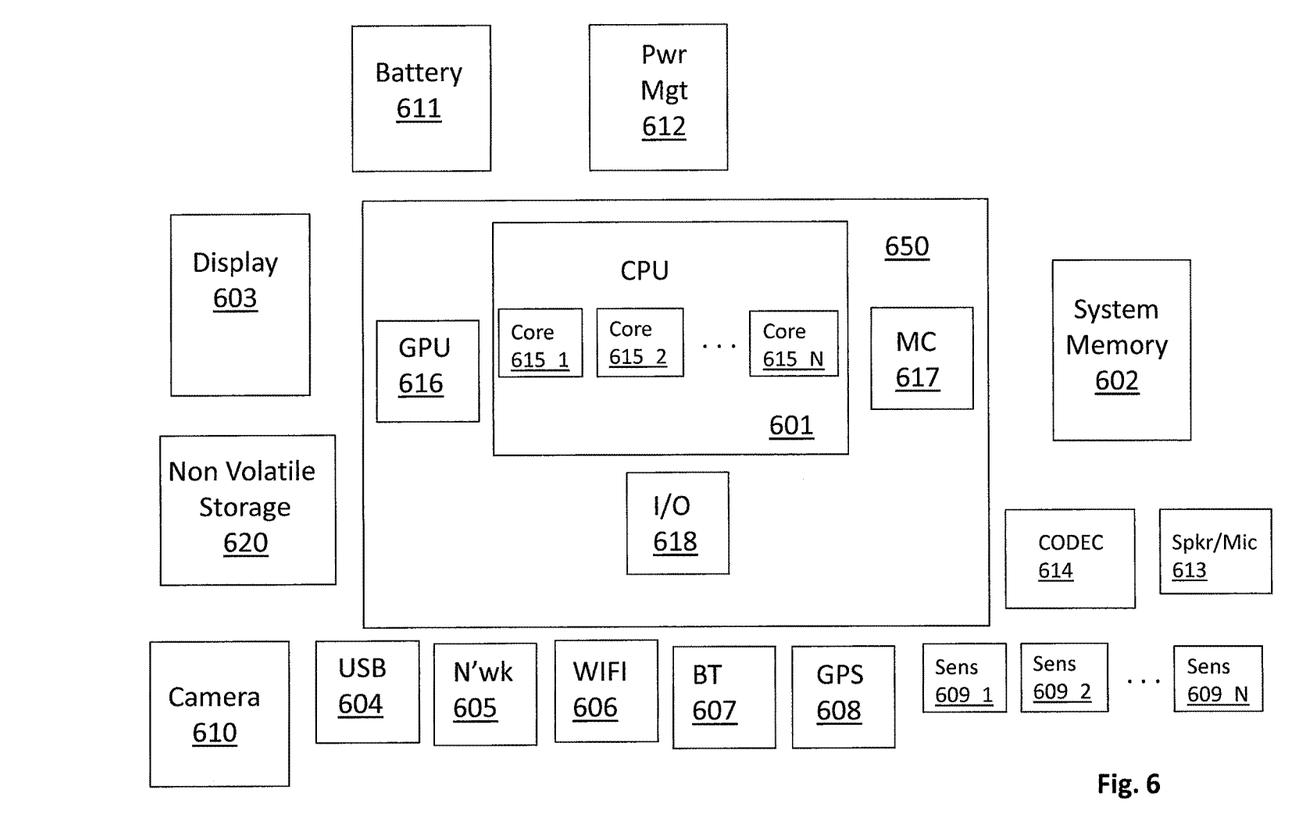
FIG. 6 shows an embodiment of a computing system.

FIG. 6 shows a depiction of an exemplary computing system 600 such as a personal computing system (e.g., desktop or laptop) or a mobile or handheld computing system such as a tablet device or smartphone. As observed in FIG. 6, the basic computing system may include a central processing unit 601 (which may include, e.g., a plurality of general purpose processing cores and a main memory controller disposed on an applications processor or multi-core processor), system memory 602, a display 603 (e.g., touchscreen, flat-panel), a local wired point-to-point link (e.g., USB) interface 604, various network I/O functions 605 (such as an Ethernet interface and/or cellular modem subsystem), a wireless local area network (e.g., WiFi) interface 606, a wireless point-to-point link (e.g., Bluetooth) interface 607 and a Global Positioning System interface 608, various sensors 609_1 through 609_N (e.g., one or more of a gyroscope, an accelerometer, a magnetometer, a temperature sensor, a pressure sensor, a humidity sensor, etc.), a camera 610, a battery 611, a power management control unit 612, a speaker and microphone 613 and an audio coder/decoder 614. Any of sensors 601_1 through 609_N as well as the camera 610 may include neural network semiconductor chip circuitry having MTJ learning rule circuitry described above.

An applications processor or multi-core processor 650 may include one or more general purpose processing cores 615 within its CPU 601, one or more graphical processing units 616, a memory management function 617 (e.g., a memory controller) and an I/O control function 618. The general purpose processing cores 615 typically execute the operating system and application software of the computing system. The graphics processing units 616 typically execute graphics intensive functions to, e.g., generate graphics information that is presented on the display 603. The memory control function 617 interfaces with the system memory 602. The power management control unit 612 generally controls the power consumption of the system 600.

The system memory 602 may be a multi-level system memory. The computing system may also include a cache, such as a last level cache (not shown) and associated control and table circuitry that effect pre-fetching of data as described at length above.

Each of the touchscreen display 603, the communication interfaces 604-607, the GPS interface 608, the sensors 609, the camera 610, and the speaker/microphone codec 613, 614 all can be viewed as various forms of I/O (input and/or output) relative to the overall computing system including, where appropriate, an integrated peripheral device as well (e.g., the camera 610). Depending on implementation, various ones of these I/O components may be integrated on the applications processor/multi-core processor 650 or may be located off the die or outside the package of the applications processor/multi-core processor 650.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
   creating a first data pattern access record for a region of system memory in response to a cache miss at a host side cache for a first memory access request, the first memory access request specifying an address within the region of system memory;
   fetching a previously existing data access pattern record for the region from the system memory in response to the cache miss, the previously existing data access pattern record identifying blocks of data within the region that have been previously accessed; and
   pre-fetching the blocks from the system memory and storing the blocks in the cache; and,
   merging the first data access pattern record with the previously existing data access pattern access record and storing the merged content into a merged data access pattern record in a table that is local to the cache.

2. The method of claim 1 wherein the cache comprises a last level cache.

3. The method of claim 1 wherein the system memory comprises a multi-level system memory.

4. The method of claim 3 wherein the previously existing data access pattern record is fetched from a higher level of the multi-level system memory.

5. The method of claim 4 wherein the higher level of the multi-level system memory is configured as a memory side cache.

6. The method of claim 1 wherein the method further comprises receiving a second memory access request that specifies a second address within the region of system memory before the fetching of the previously existing data access pattern record, and, updating the first data access pattern record to reflect access to a block that the second address is within.

7. The method of claim 1 wherein the method further comprises evicting the merged data access pattern from the table and storing the merged data access pattern into the system memory in response to a data item being evicted from the cache whose address is within the region.

8. An apparatus, comprising:
   control logic circuitry associated with a host side cache, the control logic circuitry to:
   create a first data pattern access record for a region of a system memory in response to a cache miss at the cache for a first memory access request, the first memory access request to specify an address within the region of system memory;
   store the first data pattern access record in a table;
   cause a previously existing data access pattern record for the region to be fetched from the system memory in response to the cache miss, the previously existing data access pattern record to identify blocks of data within the region that have been previously accessed;
   cause the blocks to be pre-fetched from the system memory and store the blocks in the cache; and,
   merge the first data access pattern record with the previously existing data access pattern record and store a resultant merged data access pattern record in the table.

9. The apparatus of claim 8, wherein the cache comprises a last level cache.

10. The apparatus of claim 8 wherein the system memory comprises a multi-level system memory.

11. The apparatus of claim 10, further comprising a memory controller, wherein the memory controller is to fetch the previously existing data access pattern record from a higher level of the multi-level system memory.

12. The apparatus of claim 11 wherein the higher level of the multi-level system memory is configured as a memory side cache.

13. The apparatus of claim 8, further comprising the host side cache and wherein the cache is to receive a second memory access request that specifies a second address within the region of system memory before the control logic circuitry receives the previously existing data access pattern record, the control logic circuitry to update the first data access pattern record to reflect access to a block that the second address is within.

14. The apparatus of claim 8 wherein, the control logic circuitry is to evict the merged data access pattern record from the table and cause the merged data access pattern record to be stored into the system memory in response to a data item being evicted from the cache whose address is within the region.

15. An apparatus, comprising:
   a plurality of general processing cores;
   a multi-level system memory;
   a networking interface communicatively coupled to at least one of the plurality of general purpose processing cores;
   a memory controller coupled between the plurality of processing cores and the networking interface, the memory controller coupled to the multi-level system memory and communicatively coupled to at least one of the plurality of general purpose processing cores;
   a last level cache;
   control logic circuitry and table circuitry associated with the last level cache, the control logic circuitry to:

create a first data pattern access record for a region of the system memory in response to a miss at the last level cache for a first memory access request, the first memory access request specifying an address within the region of the system memory;

store the first data pattern access record in the table circuitry;

cause a previously existing data access pattern record for the region to be fetched from the system memory via the memory controller in response to the cache miss, the previously existing data access pattern record identifying blocks of data within the region that have been previously accessed;

cause the blocks to be pre-fetched from the system memory and store the blocks in the last level cache; and, merge the first data access pattern record with the previously existing data access pattern record and store a resultant merged data access pattern record in the table circuitry.

16. The apparatus of claim 15 wherein the previously existing data access pattern record is fetched from a higher level of the multi-level system memory.

17. The apparatus of claim 16 wherein the higher level of the multi-level system memory is configured as a memory side cache.

* * * * *